US009202027B2

(12) United States Patent
Odessky et al.

(10) Patent No.: US 9,202,027 B2
(45) Date of Patent: Dec. 1, 2015

(54) PRIVATE/PUBLIC GESTURE SECURITY SYSTEM AND METHOD OF OPERATION THEREOF

(71) Applicant: France Telecom, Paris (FR)

(72) Inventors: Adam Odessky, San Francisco, CA (US); Julian Gay, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 267 days.

(21) Appl. No.: 13/717,200

(22) Filed: Dec. 17, 2012

(65) Prior Publication Data

US 2014/0006794 A1  Jan. 2, 2014

Related U.S. Application Data

(60) Provisional application No. 61/576,256, filed on Dec. 15, 2011.

(51) Int. Cl.
| | | |
|---|---|---|
| G06F 21/00 | (2013.01) | |
| G06F 21/31 | (2013.01) | |
| G06F 21/36 | (2013.01) | |
| G07C 9/00 | (2006.01) | |

(52) U.S. Cl.
CPC ............... *G06F 21/31* (2013.01); *G06F 21/36* (2013.01); *G07C 9/00158* (2013.01); *G07C 2209/65* (2013.01)

(58) Field of Classification Search
CPC ..... G06F 3/017; G06F 3/0304; G06F 1/1694; G06F 21/31; H04L 9/32; H04L 63/08; G06K 9/00335; G07C 9/00158
See application file for complete search history.

(56) References Cited

U.S. PATENT DOCUMENTS

| | | | | |
|---|---|---|---|---|
| 6,421,453 | B1 * | 7/2002 | Kanevsky et al. | ............ 382/115 |
| 2009/0282472 | A1 * | 11/2009 | Hamilton et al. | ............... 726/15 |
| 2011/0193939 | A1 * | 8/2011 | Vassigh et al. | .................. 348/46 |
| 2011/0225498 | A1 * | 9/2011 | Goldman et al. | ............. 715/727 |
| 2012/0151601 | A1 * | 6/2012 | Inami et al. | ..................... 726/26 |

OTHER PUBLICATIONS

"Method for Access Control via GEstural Verification", Sep. 1, 1993, IBM Technical Disclosure Bulletin Sep. 1993 US, vol. 36 Issue 9B, pp. 487-488.*

* cited by examiner

*Primary Examiner* — Eleni Shiferaw
*Assistant Examiner* — Gregory M Elmore
(74) *Attorney, Agent, or Firm* — David D. Brush; Westman, Champlin & Koehler, P.A.

(57) ABSTRACT

A secure communication method including: obtaining sensor information of at least one user, the sensor information including one or more of image information or depth information; recognizing at least one gesture in accordance with the sensor information of the at least one user; determining whether each of the recognized at least one gesture is a public gesture or a private gesture in accordance with a zone where the gesture was performed, the zone being selected from a plurality of zones; and authorizing access to a resource when it is determined that the at least one gesture is determined to be the public gesture or the private gesture.

15 Claims, 6 Drawing Sheets

＃ PRIVATE/PUBLIC GESTURE SECURITY SYSTEM AND METHOD OF OPERATION THEREOF

CROSS REFERENCE TO RELATED APPLICATION

The present application is based on and claims the benefit of U.S. provisional patent application No. 61/576,256, filed Dec. 15, 2011, the content of which is hereby incorporated by reference in its entirety.

FIELD OF THE PRESENT SYSTEM

The present system relates to a gesture-based secure access system and, more particularly, to a gesture-based method to generate and/or distribute private and/or public cryptographic keys for encrypting and/or decrypting content.

BACKGROUND OF THE PRESENT SYSTEM

Typically, cryptography methods are used to encrypt or lock data to form cyphertext and thereafter decrypt or unlock the cyphertext to obtain a copy of the original data. A common cryptography method is known as public/private key cryptography (typically termed public key cryptography or simply PKC) and uses two keys which may be associated with an owner: a first key (e.g., an encryption or lock key) to lock or encrypt data such as plain text data that may be used to form cyphertext; and a second key (e.g., a decryption or unlock key) to unlock or decrypt the cyphertext. The keys typically include cyphertext or plaintext data that denotes a certain digital signature. Typically, one of the keys associated with data may be published or otherwise denoted public and the other key typically retained by an entity may be private. Public key cryptography enables different types of communication methods such as a secure communication method and/or a signature verification communication method to be realized depending upon whether the encryption or decryption keys are public or private. For example, in a secure public/private key cryptography communication system, the encryption key is public while the decryption key is private. However, in a signature verification cryptography communication system, the encryption key is private and the decryption key is public (e.g., see, en.wikipedia.org/wiki/Public-key_cryptography).

Unfortunately, conventional encryption methods rely upon text-based methods to generate encryption keys and a text entry method for communicating the encryption keys. Thus, the generation and/or communication of the keys typically requires physical interaction of the user with a keyboard of a computer to generate and/or communicate encryption or decryption keys before a secure communication of content (e.g., files, directories, etc.) can be realized. This process may be burdensome and inconvenient.

SUMMARY OF THE PRESENT SYSTEM

In accordance with an aspect of the present system, there is disclosed a system, method, device, computer program, user interface, and/or apparatus (hereinafter each of which will be commonly referred to as a system unless the context indicates otherwise for the sake of clarity) to generate and/or distribute private and/or public encryption keys in accordance with a gesture-based approach. Accordingly, a user may produce and/or distribute one or more of private and/or public encryption keys using gesture-based methods. Further, embodiments of the present system may authorize access to resources such as applications, directories, and/or content (e.g., files, etc.) in accordance with private and/or public gestures formed by one or more users. Moreover, the system may provide a natural user interface (NUI) for a user to interact with using motion-based inputs such as gestures and the like.

In accordance with embodiments of the present system, there is disclosed a secure communication method, the method may include acts which are performed by a processor, the acts may include: obtaining sensor information of at least one user, the sensor information comprising one or more of image information and depth information; recognizing at least one gesture in accordance with the sensor information of the at least one user; determining whether each of the recognized at least one gesture is a public gesture or a private gesture in accordance with a zone where the gesture was performed, the zone being selected from a plurality of zones; and authorizing access to a resource when it is determined that the at least one gesture is determined to be the public gesture or the private gesture.

The method may further include an act of determining locations of each of the one plurality of zones relative to a body frame of the at least one user, wherein each zone of the plurality of zones is a public zone or a private zone. Further, the method may include an act of determining that the first gesture is a public gesture when it is determined that the first gesture was performed in the public zone. Moreover, the method may include act of determining that the second gesture is a private gesture when it is determined that the second gesture was performed in the private zone. Further, the act of authorizing access to the resource may include an act of providing a secure video call or an act of authorizing the at least one user to access the resource, the resource may include a database, a computer application, or content. It is also envisioned that the method may include an act of obtaining at least one of a public encryption key corresponding to the public gesture and a private encryption key corresponding to the private gesture in response to the recognized at least one gesture. Moreover, the method may include acts of associating the public encryption key with the public gesture and associating the private encryption key with the private gesture.

In accordance with yet another aspect of the present system, there is disclosed a secure communication system including a processor which: obtains sensor information of at least one user, the sensor information including one or more of image information and depth information; recognizes first and second gestures in accordance with the sensor information of the at least one user; determines whether the first gesture includes a public gesture; determines whether the second gesture includes a private gesture; and/or authorizes access to a resource when it is determined that the first gesture includes a public gesture and the second gesture includes a private gesture.

It is further envisioned that the processor may determine locations of public and private zones relative to a body frame of the at least one user; and/or may determine that the first gesture is a public gesture when it is determined that the first gesture was performed in the public zone. Similarly, it is envisioned that the processor further may determine that the second gesture is a private gesture when it is determined that the second gesture was performed in the private zone. It is also envisioned that to authorize access to the resource, the processor may authorize a secure video call and/or may authorize the at least one user to access a resource including a database, a computer application, or content. It is further envisioned that the processor may further obtain at least one of a public encryption key corresponding to the public gesture and a private encryption key corresponding to the private gesture in response to the recognized at least one gesture. Moreover, it is envisioned that the processor may associate the public encryption key with the public gesture and associate the private encryption key with the private gesture, during, for example, a training process performed by a training application.

In accordance with yet a further aspect of the present system there is disclosed a computer program stored on a computer readable non-transitory memory medium, the computer program may be configured to perform a secure communication process, the computer program may include a program portion configured to: obtain sensor information of at least one user, the sensor information comprising one or more of image information and depth information; recognize at least one gesture in accordance with the sensor information of the at least one user; determine whether each of the recognized at least one gesture is a public gesture or a private gesture in accordance with a zone where the gesture was performed, the zone being selected from a plurality of zones; and authorize access to a resource when it is determined that the at least one gesture is determined to be the public gesture or the private gesture.

It is further envisioned that the program portion may be configured to determine locations of each of the one plurality of zones relative to a body frame of the at least one user, wherein each zone of the plurality of zones is a public zone or a private zone. Further, the program portion may be further configured to determine that the first gesture is a public gesture when it is determined that the first gesture was performed in the public zone. Moreover, the program portion may be further configured to determine that the second gesture is a private gesture when it is determined that the second gesture was performed in the private zone. It is also envisioned that the program portion may be further configured to authorize a secure video call or authorize the at least one user to access a resource including a database, a computer application, or content, when the program portion authorizes access to the resource. It is further envisioned that the program portion may be further configured to obtain at least one of a public encryption key corresponding to the public gesture and a private encryption key corresponding to the private gesture in response to the recognized at least one gesture.

BRIEF DESCRIPTION OF THE DRAWINGS

Aspects of the present disclosure are explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements.

The term rendering and formatives thereof as utilized herein refer to providing content, such as digital media which may include, for example, image information, content, messages, status information, settings, audio information, audiovisual information, video information, data, files, etc., such that it may be perceived by at least one user sense, such as a sense of sight and/or a sense of hearing. For example, the present system may render a user interface (UI) on a display device so that it may be seen and interacted with by a user.

Figure 1:
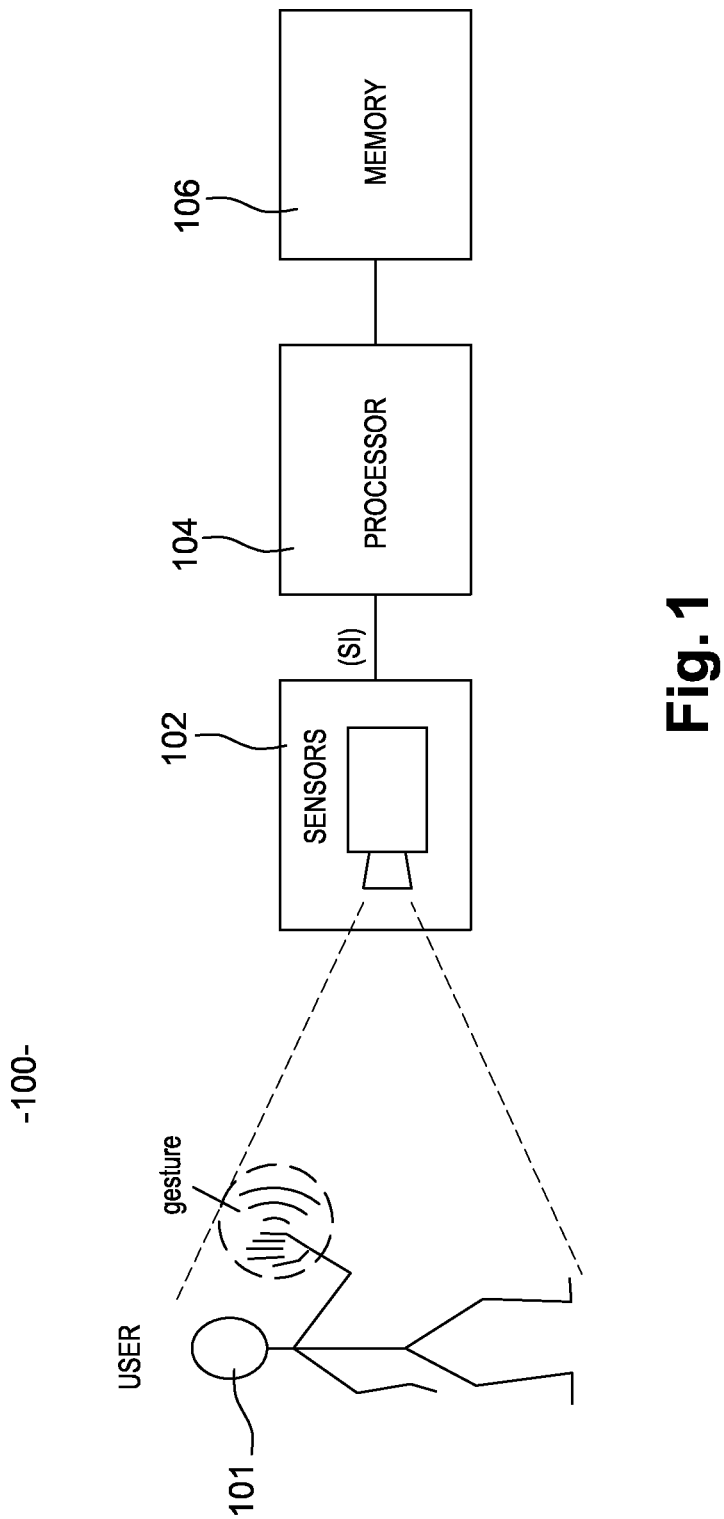
FIG. 1 shows a portion of a system in accordance with embodiments of the present system.

FIG. 1 shows a portion of a system 100 in accordance with embodiments of the present system. The system 100 may include a processor 104 coupled to one or more of sensors 102 and a memory 106. The sensors 102 may include one or more of camera (e.g., a video camera, etc.), a microphone (e.g., to record a voice of a user, etc.), a depth and/or distance sensor (hereinafter both of which may be referred to as a depth sensor unless the context indicates otherwise for the sake of clarity, e.g., infrared (IR) sensors, microwave sensors, etc.), an ambient condition sensor (e.g., a thermometer, a barometer, a humidistat, a precipitation sensor, etc.), and/or biometric sensors (e.g., a fingerprint reader, an iris reader, etc.). The sensors 102 may detect a user 101 and capture image information (e.g., picture information, video image information, etc.) of the user 101, and/or depth (and/or distance) information related to one or more parts of the user 101 and/or the user's surroundings and form corresponding sensor information (SI). The SI may be transmitted to the processor 104 for further processing, such as analysis in accordance with embodiments of the present system. The sensors 102 may include conventional motion-sensing sensors such as the Kinect™ or Kinect™-type sensors which may provide sensory input to provide a NUI for the user to interact with. Further, the sensors 102 may determine ambient condition information (e.g. temperature, pressure, humidity, precipitation, etc.) and/or location information (e.g., geographic location, etc.) at the location of the sensors 102 and include this information in the SI. Moreover, the biometric sensors may capture biometric information related to the user (e.g., such as an iris scan) and include this information in the SI.

In accordance with embodiments of the present system, the processor 104 may control the overall operation of the system 100. After receiving the SI, the processor 104 may analyze the SI using a suitable data analysis method or methods (e.g., image analysis, digital signal processing (DSP), etc.) to identify the user 101, track a body frame of the user 101, determine whether the user 101 has performed any gestures, and/or to identify these gestures if performed. For example, the processor 104 may identify the user 101 using image recognition, voice recognition, biometrics, etc. Further, the processor 104 may obtain user information from the memory 106 and determine whether an identified user is an authorized user. In accordance with embodiments of the present system, an authorized user is a user that is recognized and authorized for a given action (such as providing one or more of a public and/or private gesture as described further herein) based on user data. For example, user data may be stored in the memory 106 and/or may be generated by the system 100 such as user account information, pre-stored gesture information (PGI), SI, etc.

In accordance with embodiments of the present system, gestures may include public or private gestures and may be entered individually, sequentially and/or serially. The present system discriminates and recognizes both public and private gestures. As used herein, a public gesture may be a gesture made by a user (e.g., an authorized user) that is made within a zone that is determined by the system to be a public zone. As used herein, a private gesture may be a gesture made by a user (e.g., an authorized user) that is made within a zone that is determined by the system to be a private zone. In accordance with embodiments of the present system, the present system recognizes public and private gestures and discriminates its response based on this recognition as well as on whether a user is recognized and/or authorized.

Further, the memory 106 may store gesture information (e.g., predetermined gestures) that corresponds to gestures that authorize access to given resources, group of resources, etc. In other words, the processor 104 may utilize the stored gestures in the memory 106 to determine whether a gesture provided by a user is the correct gesture to gain access to the one or more resources. Further, the memory 106 may store information identifying whether the correct gesture is a public or private gesture. In this way, to gain access to the resource, the user need provide the predetermined gesture within the proper zone. For example, a given gesture provided in the private zone may gain the user access to the resource while the same given gesture provided in the public zone will not and/or may provide access to a different given resource. In addition, by ensuring that the gesture is provided by an authorized user, even proper gestures may be rejected when not provided by an authorized user. As there are multitudes of gestures and sequences of gestures available, security of the resources can be ensured while greatly simplifying the interaction of the user with the resource.

For example, during a video conference it may be assumed that public gestures may be seen by others (e.g., are not secure) and private gestures should not be seen by others (e.g., are secure). Thus, in accordance with embodiments of the present system, private gestures of the user 101 may be captured by the sensors 102 but may not be transmitted (e.g., to other participants during a video conference call) so that they remain secure. For example, when engaging in a video call, the user 101 (e.g., a caller in the present example) may form a public gesture which may be captured by a camera of the sensors 102 and thereafter, be transmitted to other parties of the call (e.g., a callee). However, if the user 101 forms a private gesture, although it may be captured by the sensors 102, it should not be transmitted to the other parties of the call. Naturally, as may be readily appreciated, in accordance with embodiments of the present system, recognized gestures, whether public or private may also not be transmitted however, may be utilized by the present system, (e.g., for decryption/encryption of cyphertext).

In accordance with embodiments of the present system, the system 100 may define public and private zones as two- or three-dimensional zones relative to a body frame of the user 101 in which gestures may be performed by the user 101. Each zone may occupy a two- or three-dimensional space and may be located close to the body of the user 101 such that the user 101 can perform gestures within a corresponding zone. The system may form a public zone such that it is larger than a corresponding private zone. Further, the system may locate a private zone close to a center of a body frame of a user and in front of the user as opposed to a public zone which may be positioned away from the body of the user.

Accordingly, the processor 104 may analyze SI to determine locations as well as a shape and/or size of each of the public and private zones relative to a body frame of a user 101 in two- or three-dimensional space. In accordance with embodiments of the present system, the locations as well as a shape and/or size of each of the public and private zones may be relative to an object and/or person other than the user 101. For example, a location, shape and/or size of a private zone may be adjusted relative to a person present before the sensors 102 that is not the user 101 yet that has a view within the sensor area. In these embodiments, the system may adjust the public and/or private zones relative to the person. For example, the private zone may be adjusted by the system such that it corresponds to an area around the body of the user 101 that is not viewable by the person. This adjustment of the public/private zones may also be provided relative to objects such as windows, doors, mirrors, etc., within an area around the user 101 to ensure that gestures for example provided within the private zone, are not viewable by persons other than the user 101 due to these objects.

Further, the system 100 may crop image information of the user 101 which is captured by the sensors 102 such that image information within the private zone remains secure and is not transmitted to others such another party of a video call. The processor 104 may further define the public and/or private zones in space using a suitable coordinate system such as a Cartesian coordinate system using x, y, and/or z axis minimums and maximums. Similarly, the processor 104 may determine a location of the body frame of the user and define this location using x, y, and/or z axis minimums and maximums. Although a two-zone system is described for the sake of clarity, it is envisioned that the system may be configured with other numbers of zones such as a three or four zone system, etc. Moreover, although continuous zones are described herein, it is envisioned that in other embodiments, the zones may be discontinuous, if desired.

Figure 2A:
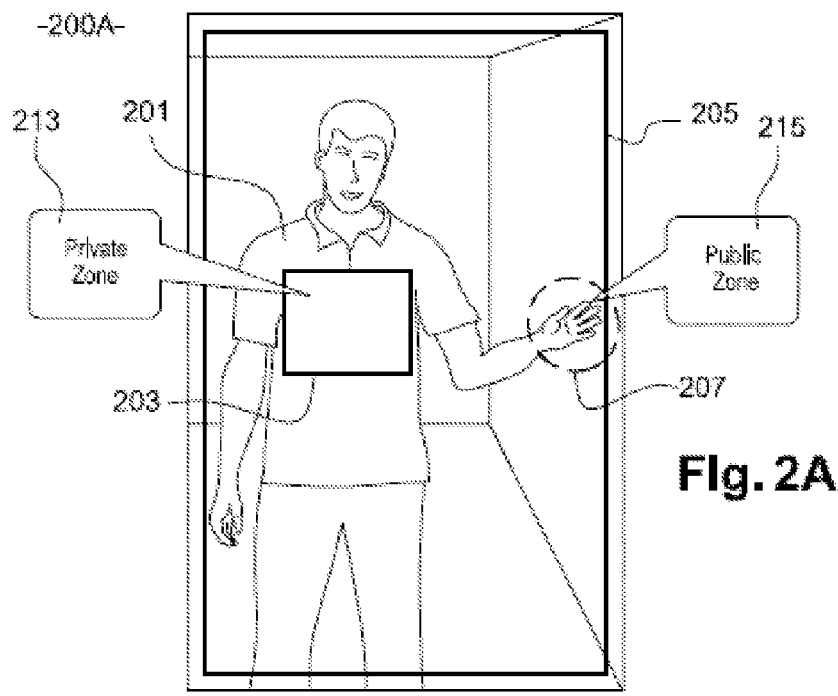
FIG. 2A shows a screen shot of a user entering a public gesture in accordance with embodiments of the present system.

Examples of public and private gestures entered by a user are described with reference to FIGS. 2A and 2B, respectively. FIG. 2A shows a screen shot 200A of a user 201 entering a public gesture as shown by a gesture frame 207 in accordance with embodiments of the present system. Sensors of the present system may capture image and/or depth information of the user 201 and the system may track for example, a body frame of the user using this information. Thereafter, the system may define a private zone 203 and a public zone 205 with relation to this user, with relation to other persons that may be around the user (e.g., within a zone that is detectable by the sensor) and/or with relation to objects (e.g., windows, doors, mirrors, etc.) that may be around the user. In accordance with embodiments of the present system, an image of the user 201 may be rendered for the convenience of the user 201. Further, if desired the private zone 203 and/or the public zone 205 may be superimposed upon this image (e.g., in real time). Further, the system may highlight and/or use text frames (e.g., see, frame 213 and 215) to highlight and/or otherwise emphasize the location of the zones for example rendered superimposed on a display viewable by the user 201 (e.g., see, FIG. 5, rendering device 530) for the convenience of the user 201. Further, the system may highlight other persons, objects, etc., around the user 201 that affects the determination of a location, shape and/or size of these zones. For example, the system may highlight and/or otherwise emphasize the location of the person and a door around the user that affects the location, shape and/or size of the private zone. In accordance with embodiments of the present system, this is one way that the user 201 may be facilitated to adjust their body position to affect the determined location, shape and/or size of the private zone. For example, it may be that due to the person and door positions relative to the user 201, the location, shape and/or size of the private zone is inconvenient for the user or that no suitable private zone exists. In this example, the user may adjust a position of their body, for example by turning their back to the person and/or door so that a more suitable private zone is established. Further, the user 201 may close the door, reposition the person, reposition themselves, etc., so that the positioning of the door/person does not have an adverse affect (e.g., no longer affects such as by closing the door) on the determination of the private zone.

When a gesture has been identified, the system may highlight the gesture using any suitable method such as by using the gesture frame 207, if desired. Further, the system may superimpose the gesture frame 207 upon the image information of the user 201. Moreover with regard to gestures, the system may identify gestures by type. For example, in the present example, the system may identify the gesture as a "public open hand wave." To identify gestures, the system may refer to a gesture library stored in a memory of the system and which may include an identification of gestures. Further, the user 201 may train the system to gestures specific to the user and/or resource and store this in the gesture library in association with the user.

Figure 2B:
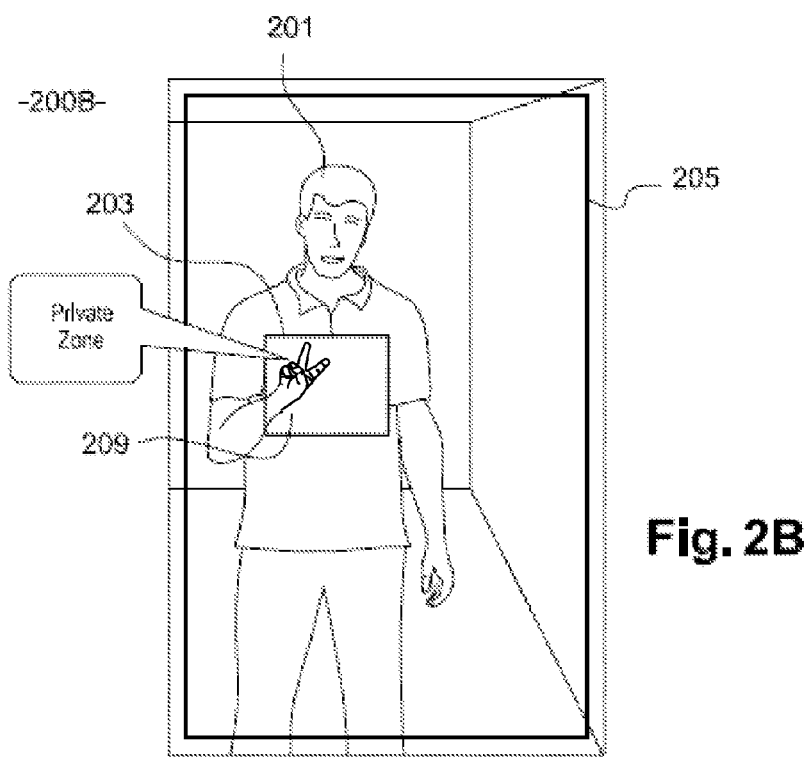
FIG. 2B shows a screen shot of the user entering a private gesture in accordance with embodiments of the present system.

FIG. 2B shows a screen shot 200B of the user 201 entering a private gesture 209 in accordance with embodiments of the present system. FIG. 2B is similar to FIG. 2A, however, the user 201 is performing a private gesture. Accordingly, the system may detect and highlight this gesture using any suitable method such as by using a gesture frame 209, if desired. The system may further identify the present gesture as a "private V-sign." In accordance with embodiments of the present system, a same gesture (e.g., V-sign) will be interpreted differently by the present system based on whether a gesture is recognized from a public or private zone.

In the examples shown in FIGS. 2A and 2B, public and private gestures are entered separately from each other (e.g., one at a time) and, thus, may be considered sequential gestures. It is further envisioned that a sequence of the first and second gestures (i.e., gestures that are recognized) may be compared to a predefined sequence order or a plurality of different sequence orders. Accordingly, if the order of the gestures is not found to be in accord with that of the predefined sequence setting or one of the predefined sequence settings, the user will not be authorized to perform an action, such as decrypt a document or otherwise be provided access to a resource. Thus, the act of authorizing access to a resource may be dependent upon one or more users providing gestures in a correct sequence.

Figure 2C:
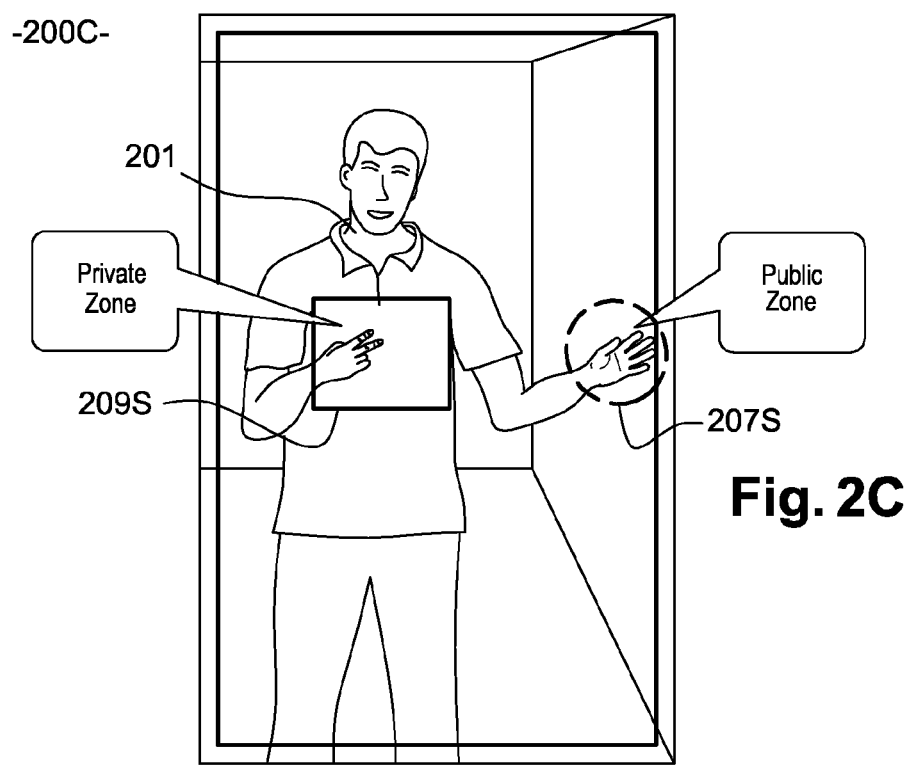
FIG. 2C which shows a screen shot of the user simultaneously entering a public gesture and a private gesture.

However, gestures may also be entered simultaneously as illustrated by FIG. 2C which shows a screen shot 200C of the user simultaneously entering a public gesture (e.g., see, gesture 207S) and a private gesture (e.g., see, gesture frame 209S). Similarly to the gesture shown in FIG. 2A, the public gesture is an "open hand wave." Further, the private gesture is similar to the gesture of FIG. 2B, a "V-sign." In these embodiments, the act of authorizing access to a resource may be dependent upon one or more users providing the correct gestures substantially simultaneously. In further embodiments, the act of authorizing access to a resource may be dependent upon one or more users providing the correct gestures without regard to a relative timing of providing each of the correct gestures.

In accordance with embodiments of the present system, when sequential gestures are being recognized, the system may determine when a gesture was received and/or made for example by analyzing time-stamp information which may be included in the SI. In accordance with embodiments of the present system, the sequencing of the images may be utilized for determining an ordering of recognized gestures. For example, an image (e.g., of a private gesture) that follows another image (e.g., of a public gesture) may be determined to follow in the sequence of recognized gestures. The system may utilize a gesture time period during which gestures may follow each other. In these embodiments, when the gesture time period lapses, gestures made by the user may be ignored and the user may have to reenter a gesture pair (e.g., which may include private and public gestures) in accordance with a predetermine sequence as may be set by the system, the user, or be otherwise predetermined (e.g. private then public gesture within three seconds, etc.).

Referring back to gestures, they may be performed in the public or private zones and may include a movement or contortion of the body, including limb movements (e.g., movement of the hands, arms, feet), facial movements (e.g., eyebrows, eyes, mouth, ears, smiles, etc.), and other body movements. The gestures may also be combined with authentication methods such as text passwords, voice recognitions, biometrics, etc., in order for authentication to occur. Thus, for example, a user may be requested to enter a voice pattern for voice recognition before the system may accept gestures for example to grant access to a resource.

To input a gesture into the system, the user may stand in a field-of-view of the sensors of the system such as camera and/or depth sensors that may capture image information, depth information of the user and/or of persons and/or objects around the user. Thereafter, this information may be analyzed by the system to detect gestures, determine public and/or private zones and/or to determine if the gestures are performed within a specified zone (e.g., a public zone or a private zone in the present example). It is further envisioned that the system may render a request to the user to perform a gesture such as a public gesture or a private gesture. In some embodiments, a gesture may have an associated encryption key which may be retrieved in response to a recognized gesture and may be used as an encryption/decryption key. In the same or other embodiments, a gesture may have an associated gesture key which may be utilized directly.

In accordance with embodiments of the present system, these keys may generally be referred to as a public key or a private key depending upon whether they correspond with a public or private gesture. Thus, for example, a private gesture may have an associated private key and a public gesture may have an associated public key. Accordingly, when it is detected that the user has input a private gesture, the process may obtain an associated private key. In a similar manner, when it is detected that the user has input a public gesture, the process may obtain an associated public key. The associated encryption keys may be stored in memory of the system or may be generated in response to a correct gesture input. Upon the successful completion of the gesture(s), the system may accept or reject the corresponding encryption keys.

Figure 3:
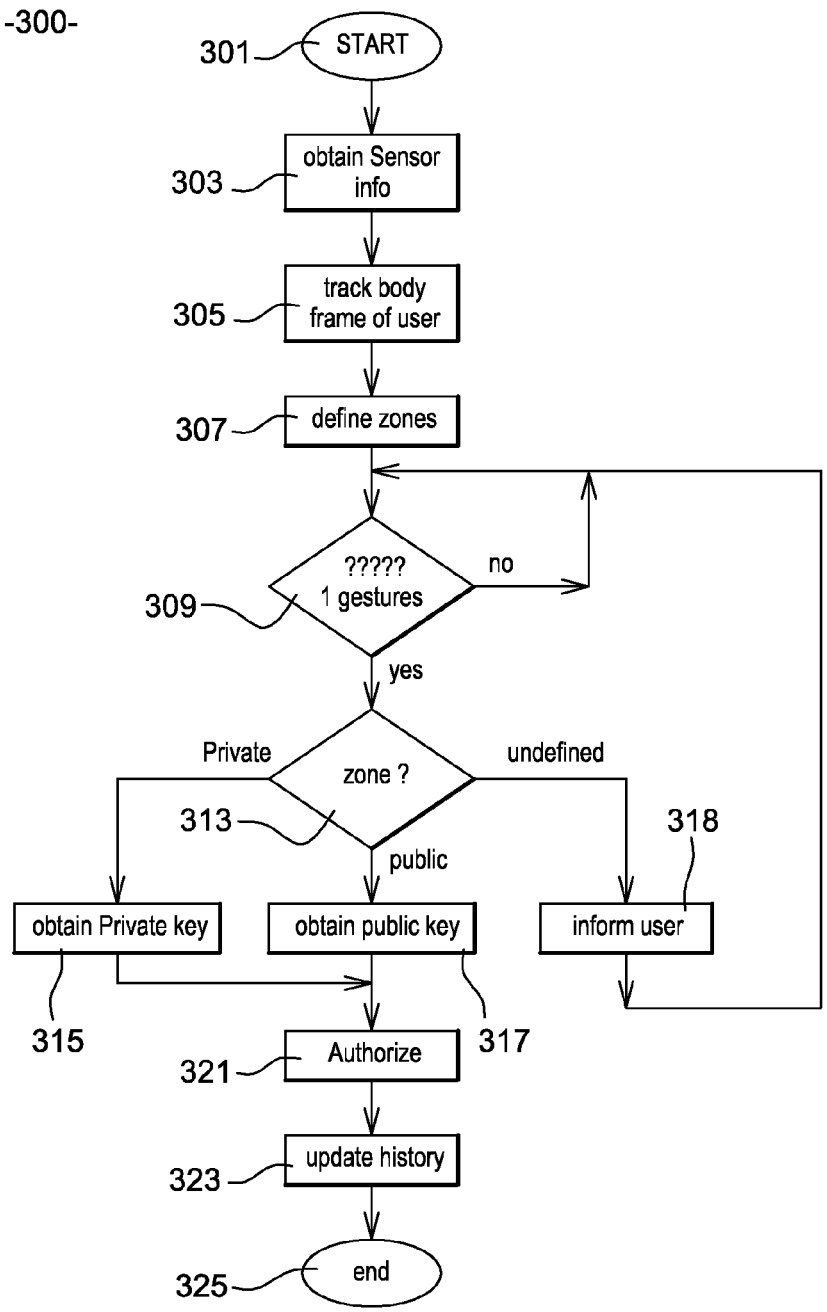
FIG. 3 shows a flow diagram that illustrates a process in accordance with embodiments of the present system.

FIG. 3 shows a flow diagram that illustrates a process 300 in accordance with embodiments of the present system. The process 300 may be performed using one or more computers communicating over a network. The process 300 may include one of more of the following acts. Further, one or more of these acts may be combined and/or separated into sub-acts, if desired. During process 300 only a single user is discussed for the sake of clarity. However, in accordance with embodiments of the present system, the operative acts of the process 300 may be performed for a plurality of users. Accordingly, the process may analyze each user and/or an interaction between users to determine who may form gestures in interaction between two or more users.

In operation, the process 300 may start during act 301 and then proceed to act 303. During act 303, the process may obtain sensor information (SI) of a user from one or more sensors of the system. The sensor information may be transmitted in response to a request of the process or may be pushed when, for example, the user is detected. However, it is also envisioned that the sensor information may be collected when, for example, the user performs certain actions such as when the user starts a given application (e.g., a video calling application, a secure entry door application, etc.), attempts to access a directory or file, etc. As discussed elsewhere, the sensor information may include image information and depth information of the user. However, other information such as time (e.g., of capture), location (e.g., geophysical, etc.), voice, atmospheric, etc., may be included in the sensor information, if desired. After completing act 303, the process may continue to act 305.

During act 305, the process may track a body frame of the user. Accordingly, the process may analyze the image information and/or depth information of the user and determine the body frame of the user in real time. The body frame of the user may be represented as a two- or three-dimensional space (e.g., area or volume) situated relative to the body of the user. Further, the process may determine (e.g., in accordance with the image information of the user, etc.) an orientation of the user (e.g., facing camera, etc.). After completing act 305, the process may continue to act 307.

During act 307, the process may define zones in accordance with the body frame of the user. Thus, for example, the system may define private and public zones as a two- or three-dimensional space relative to the body frame of the user. In the present example, the public and private zones are mutually exclusive. Accordingly, the process may take into account a field of view of a camera which may provide image information of the user to be transmitted during, for example, a video call and adjust the location, shape, and/or size of the public and/or private zones accordingly. With regard to the public zone, this zone may be defined as a space situated about a body frame of the user and which is not located within the private zone (e.g., see, frame 205, FIGS. 2A and 2B). Further, the private zone may be defined as a space situated in front of a body frame of a user.

It is envisioned that other areas and/or zones may also be defined and may be defined in relation to the body frame of the user based upon an environment of the user and/or applications used by the user. For example, when engaged in a video call, the public zone may extend from the torso of the user above the private zone (e.g., see, FIG. 4, 400C and 400D). Accordingly, the process may crop images of the user which are transmitted (e.g., during a video call, etc.) to other parties of the call in accordance with the location, shape, and/or size of the public and private zones. Further, the locations, shape and/or size of each of the public and private zones may be relative to an object and/or person around the user. After completing act 307, the process may continue to act 309.

During act 309, the process may determine whether the user has performed at least one gesture, such as by determining that the user has performed a recognized gesture (e.g., following capture and analysis of one or more captured images). In a case wherein it is determined that the user has performed at least one gesture, the process may continue to act 313. However, if it is determined that the user has not performed at least one gesture, the process may repeat act 309 and await entry of one or more gestures by the user that correspond to a recognized gesture.

During act 313, the process may determine a zone where the at least one gesture was performed. Accordingly, if it is determined that the zone where the at least one gesture was performed is a private zone, the process may determine that the at least one gesture is a private gesture and continue to act 315. Similarly, if it is determined that the zone where the at least one gesture was performed is a public zone, the process may determine that the at least one gesture is a public gesture and continue to act 317. Further, if it is determined that the zone where the at least one gesture was performed is an undefined zone (e.g., the location was outside of a defined zone such as the public and private zones), the process may determine that the at least one gesture is an undefined zone gesture and continue to act 319.

During act 315 after a private gesture is recognized by the system, the process may obtain or generate a private key associated with the at least one gesture. In the present embodiment, for purpose of simplifying the following discussion, it will be assumed that the private key is common to all recognized private gestures. However, in accordance with embodiments of the present system, a private key may be specific to a particular private gesture. For example, if the private gesture is an open palm, the process may obtain a first private key while, if the private gesture is a closed palm, the process may obtain a different private key. Further, the private key may be a simple key (e.g., a flag, a bit, etc.) or may be a cryptographic key (e.g., a complex multi-digit number). After completing act 315, the process may continue to act 321.

During act 317 after a public gesture is recognized by the system, the process may obtain or generate (depending upon system settings) a public gesture key corresponding with the at least one gesture. In the present embodiment, it will be assumed that the public gesture key will be common to all public gestures. However, it is also envisioned that a public gesture key may be specific to a particular public gesture. For example, in a case wherein the public gesture is an open palm, the process may obtain a first public gesture key while, if the public gesture is a closed palm, the process may obtain a different public gesture key. Further, it is envisioned that the process may distribute the public key to one or more desired contacts and/or addresses (e.g., to Bob, a website address, an email address, etc.) using any suitable method (e.g., email, SMS, website registration, etc.) if desired. After completing act 317, the process may continue to act 321.

During act 319 after it is determined that the at least one gesture is an undefined zone gesture, the process may render a message which may inform the user that the at least one gesture was performed in an undefined zone and requesting reentry of a gesture or gesture sequence. After completing act 319, the process may repeat act 309.

During act 321, the process may authorize access to a resource such as content, a database, an application, a file, a video call, etc., in accordance with the private and/or public keys which may have been obtained during acts 315 and/or 317, above. For example, in embodiments of the present system, if both the private and public keys are obtained, then the process may authorize a user to access a directory, a file, content, an application, etc. in accordance with system settings which may be set by the system and/or user. Further, it is envisioned that the process may interface with a third-party encryption application (e.g., pretty good privacy (PGP™), etc.) to encrypt/sign and/or decrypt/verify content in accordance with asymmetric and/or symmetric encryption techniques using, the retrieved private and/or public keys, if desired. After completing act 321, the process may continue to act 323, where the process may update history information (e.g., including information related to the user such as identification, location, access attempts, results, times, gestures, sensor information, etc.) and store this information in a memory of the system for later use. Thereafter, the process may continue to act 325, where it may end.

Figure 4:
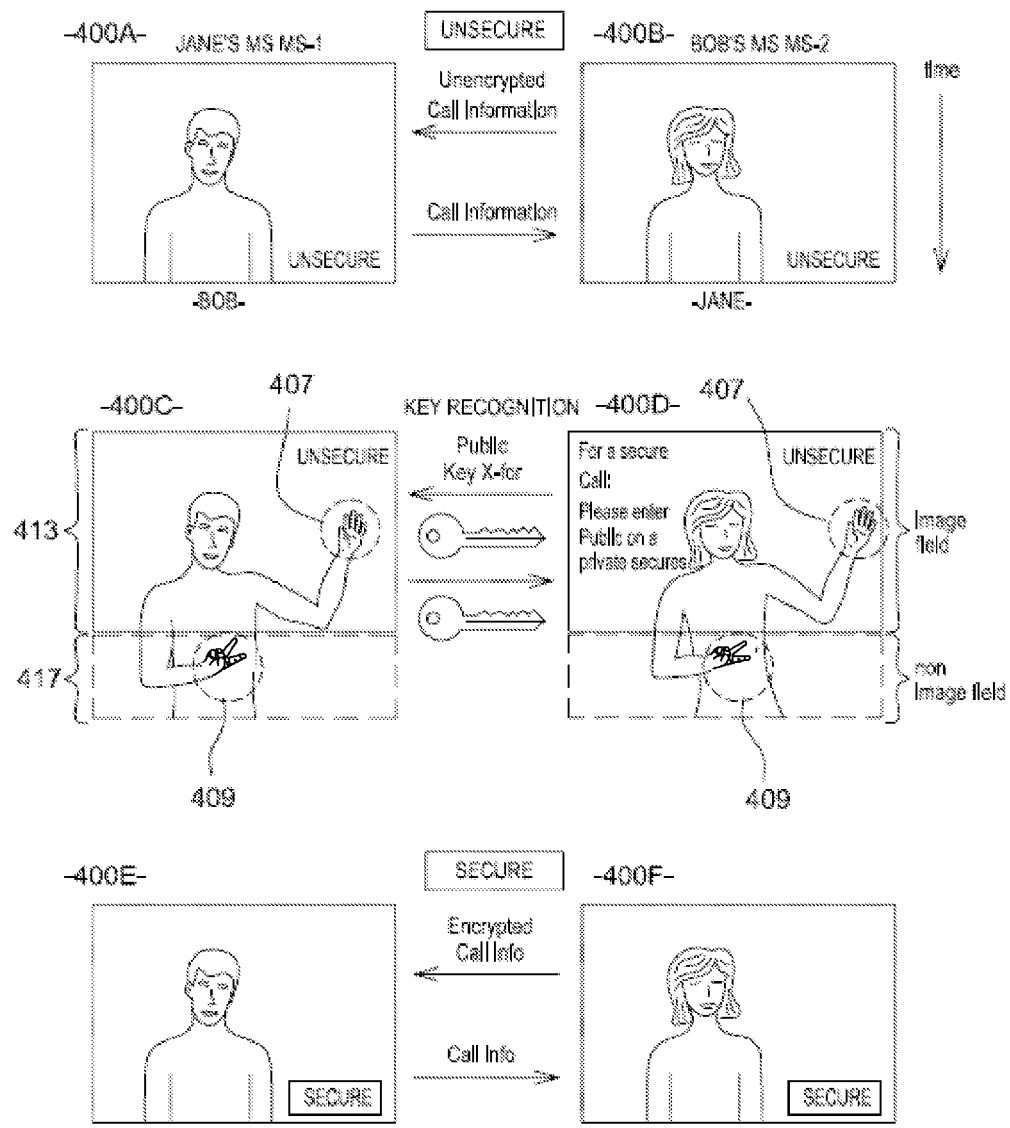
FIG. 4 shows screen shots of mobile stations rendering a video call between two users in accordance with embodiments of the present system.

FIG. 4 shows screen shots 400A through 400F of mobile stations (MSs) MS-1 and MS-2 rendering a video call between two users in accordance with embodiments of the present system. In the following example, MS-1 is Jane's MS and MS 2 is Bob's MS. Accordingly, MS-1 is rendering video received from MS-2 and vice versa as may be readily appreciated. Further, MS-1 may also render an image of what is being forwarded to MS-2 (such as in an inset within the user interface).

Screenshots 400A and 400B illustrate an unsecured video call between Bob and Jane. Referring to screenshots 400B and 400C, if during the call, Bob and Jane decide to engage in a secure video call, they may each form one or more of private gestures (e.g., 409) and/or public gestures (e.g., private gestures 407) to generate or obtain their own corresponding public and private encryption keys. Upon detecting that the keys are correct (e.g., via a comparison with expected keys in a memory of the system), the process may authorize a resource which in the present example, is a secure video conference application which may encode the video conference transmissions between the parties (e.g., video in the present example) using the public key of a recipient and decrypt the call information using a private key of a receiver. Accordingly, the secure video calling application in each respective MSs may automatically exchange (e.g., distribute) its public encryption key. During the call, the private gestures of Bob and Jane are shown in a non-image field 417 which is in a private area that is not transmitted to the other party during the call as opposed to an image field 413 which is in a public area and may be transmitted to the other party during the call. Accordingly, Bob and Jane may engage in a secure video call as shown during screenshots 400E and 400F by forming one or more of a public and/or a private gesture. In accordance with embodiments of the present system, during the cal, the MSs may display a menu item indicating a status of the call (e.g., secure or unsecure, as shown in the screenshots of FIG. 4). To end the call, or to end encryption of the call, Bob and/or Jane may form other predetermined gestures which may be recognized by their respective MSs and the call may be terminated or may thereafter be unsecured (e.g., unencrypted) based upon recognition of these gestures.

Further, it is envisioned that the system may determine whether particular space relative to a body frame of a user is secure (or not) and thus cannot (or can) be observed by other cameras and/or non-authorized individuals. Accordingly, the system may examine a three-dimensional space (e.g., using image analysis, DSP, etc.) to determine if there are any unauthorized individuals, cameras, windows, etc., and/or other devices (e.g., cameras, sensors, etc.) in a line-of-sight of the sensors that may potentially view or record a gesture formed in a space at issue. If so, the system may determine that the determined space is unsecure and the system may accordingly set this space as an unsecure space (e.g., public zone) and will not locate a private zone in the unsecure space. In this way, the system may determine whether a space corresponds to a public space or a private space relative to another (e.g., other than the user performing the gesture) object, person, etc., in addition or in place of determining the space based on the user performing the gesture.

Thereafter, the system may take into account unsecure spaces when determining a location, shape, and/or size of a private zone such that the private zone is not located within all or part of the unsecure area. Further, if a private zone has already been defined, the system may inform a user (e.g., via a message such as "the private zone is unsecure") and may adjust the size, shape, and/or location of the private zone such that the private zone is no longer located in an unsecure area. In accordance with embodiments of the present system, this analysis may be performed in real time. Accordingly, for example, if the system detects that an unauthenticated individual has walked into a room with the user, the system may determine a location as well as an orientation (e.g., facing camera, facing user, etc.) of the individual and may determine whether a private zone is unsecure. Thereafter, the system may inform the user with an appropriate message such as "the private zone is unsecure" and/or may resize, reshape, and/or relocate the private zone accordingly.

Accordingly, the present system may provide a system to enable a user to generate or obtain at least one of a public key using a public gesture and a private key using a private gesture. Further, when the system detects that a user has entered correct private and/or public gestures, the system may authorize a selected resource such as content, files, directories, applications (e.g., software, firmware, and/or hardware), etc. For example, in an embodiment of the present system, it is envisioned that the selected resource may include an automatic door lock which may unlock when access thereto is authorized.

Moreover, gestures may be further characterized as common or custom gestures, as may be set by the system and/or user. In these embodiments, a common gesture may be a gesture that is predetermined by the system while a custom gesture may correspond to a gesture that is taught to the system by a user, such as during an initialization process and/or during another interaction of the user with the system. Information related to common gestures may be obtained from a common gesture library of the system while custom gestures may be trained by the user using a training application of the present system.

Further, a "V-sign" hand gesture may be identified by the system when the user 101 extends two fingers of a corresponding hand to form a "V" regardless of an orientation of the V-sign. However, in accordance with embodiments of the present system, a hand gesture with three extended fingers may be identified by the system when the user 101 extends only three fingers of the corresponding hand outward (e.g., as opposed to downward, upwards, etc.). In these embodiments, the orientation of the gesture may comprise a portion of the gesture and thereby, illicit a different response (e.g., recognized/unrecognized) depending on the orientation.

It is further envisioned that in yet further embodiments of the present system, the public gesture may be a gesture which is performed away or close to a body of a user but, is not performed in front of the user's body as this area may be reserved for a private zone. Thus, private gestures may be performed in front of the body of the user. For example, a private gesture may include a gesture such as V-sign, whereas, a public gesture may include a motion such as moving an arm from a knee to a head of the user.

The system may begin to monitor for gestures once it has identified a body frame of the user. Further, the system may authenticate users as discussed herein before and/or after a gesture is recognized. Further, users may be authenticated to provide a gesture only if they have permission to access the system, or otherwise as per system settings. Thereafter, the system may only monitor for gestures of authenticated users, if desired.

Thus, embodiments of the present system may only authorize a user if the user performs a public gesture which may be seen by others, and a private gesture which may only be visible to the sensors of the present system. In accordance with embodiments of the present system, a private gesture/key may be utilized for encryption or decryption with the corresponding public key (e.g., from a third party) utilized for decryption or encryption.

Further, the present system may interface with conventional motion-based image capture devices such as the Xbox™ Kinect™ system by the Microsoft™ Corporation which may capture image information as well as depth information related to a users body or parts thereof. This information may then be processed by a processor of the system to track a user's movements and/or gestures in real time and determine actions performed by the user such as gestures, etc. Further, the system may request other information before authenticating a user or authorizing a user to access certain resources. For example, the system may only authorize access to a resource if ambient conditions (e.g., temperature, pressure, etc.) in the vicinity of the user are within a certain range (e.g., 70-75 deg. etc.), depending upon system settings.

Figure 5:
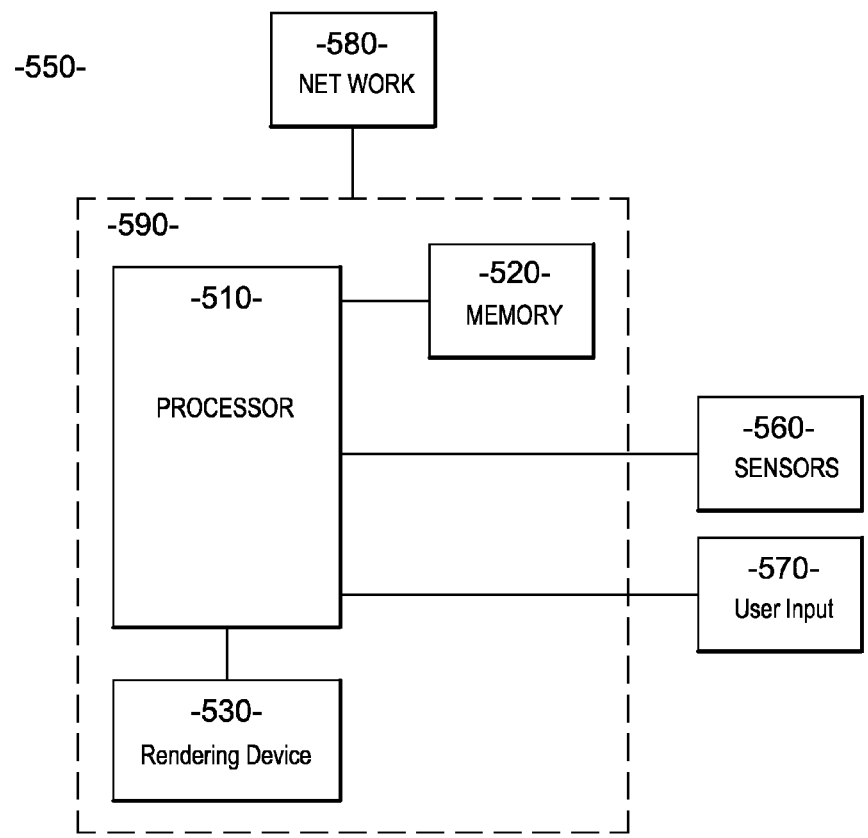
FIG. 5 shows a portion of a system in accordance with embodiments of the present system.

FIG. 5 shows a portion of a system 500 (e.g., processor, mobile station, etc.) in accordance with an embodiment of the present system. For example, a portion of the present system may include a processor 510 operationally coupled to a memory 520, a display 530, sensors 560, and a user input device 570. The memory 520 may be any type of device for storing application data as well as other data related to the described operation such as user data, gesture data, etc. The sensors 560 may include a camera (e.g., a still-image camera, a video camera, etc.) to generate image information of a user and/or depth sensors which may generate information to determine depth and/or distance of one or more body parts of a user (e.g., relative to each other and/or to other objects). The application data and other data are received by the processor 510 for configuring (e.g., programming) the processor 510 to perform operation acts in accordance with the present system. The processor 510 so configured becomes a special purpose machine particularly suited for performing in accordance with the present system.

The operation acts may include requesting, providing, and/or rendering of content. The operation acts may include one or more of identifying a user, determining public and/or private zones, identifying gestures, etc. The user input 570 may include a keyboard, mouse, trackball or other device, including touch sensitive displays, which may be stand alone or be a part of a system, such as part of a personal computer, personal digital assistant, mobile phone, smart phone, set top box, television or other device for communicating with the processor 510 via any operable link. The user input device 570 may be operable for interacting with the processor 510 including enabling interaction within a UI as described herein. Clearly the processor 510, the memory 520, display 530 and/or user input device 570 may all or partly be a portion of a computer system or other device such as a client and/or server as described herein.

The methods of the present system are particularly suited to be carried out by a computer software program, such program containing modules corresponding to one or more of the individual steps or acts described and/or envisioned by the present system. Such program may of course be embodied in a computer-readable medium (e.g., a non-transitory memory), such as an integrated chip, a peripheral device or memory, such as the memory 520 or other memory coupled to the processor 510.

The program and/or program portions contained in the memory 520 configure the processor 510 to implement the methods, operational acts, and functions disclosed herein. The memories may be distributed, for example between the clients and/or servers, or local, and the processor 510, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 510. With this definition, information accessible through a network is still within the memory, for instance, because the processor 510 may retrieve the information from the network for operation in accordance with the present system. The processor 510 is operable for providing control signals and/or performing operations in response to input signals from the user input device 570 as well as in response to other devices of a network and executing instructions stored in the memory 520. The processor 510 may be an application-specific or general-use integrated circuit(s). Further, the processor 510 may be a dedicated processor for performing in accordance with the present system or may be a general-purpose processor wherein only one of many functions operates for performing in accordance with the present system. The processor 510 may operate utilizing a program portion, multiple program segments, or may be a hardware device utilizing a dedicated or multi-purpose integrated circuit.

Further variations of the present system would readily occur to a person of ordinary skill in the art and are encompassed by the following claims. Through operation of the present system, a virtual environment solicitation is provided to a user to enable simple immersion into a virtual environment and its objects.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A secure communication method, the method comprising steps which are performed by a processor, the steps comprising:

obtaining sensor information of at least one user, the sensor information comprising one or more of image information or depth information;

recognizing, with the processor, at least one gesture in accordance with the sensor information of the at least one user;

authorizing access to a resource when the at least one gesture corresponds to a predefined gesture, the authorizing being characterized in that it further comprises:

determining, with the processor, whether the recognized at least one gesture comprises a public gesture and a private gesture in accordance with a specific zone where the gesture was performed, the specific zone being selected from a plurality of zones relative to a body frame of the at least one user, wherein the plurality of zones comprises a public zone and a private zone;

obtaining at least one of a public encryption key corresponding to the public gesture and a private encryption key corresponding to the private gesture in response to the recognized at least one gesture; and authorizing access to the resource when the processor determines that the at least one gesture comprises the public gesture and the private gesture.

2. The method of claim 1, further comprising a step of determining that the at least one gesture is the public gesture when the processor determines that the at least one gesture was performed in the public zone.

3. The method of claim 1, further comprising a step of determining that the at least one gesture is the private gesture when the processor determines that the at least one gesture was performed in the private zone.

4. The method of claim 1, wherein the step of authorizing access to the resource comprises a step of authorizing a secure video call or a step of authorizing the at least one user to access the resource comprising a database, a computer application, or content.

5. The method of claim 1, further comprising a step of associating a public encryption key with the public gesture and associating a private encryption key with the private gesture.

6. A secure communication system comprising:
a processor;
a memory comprising computer-readable instructions stored thereon, the instructions comprising instructions that configure the processor to obtain sensor information of at least one user, the sensor information comprising one or more of image information or depth information;

instructions that configure the processor to recognize at least one gesture in accordance with the sensor information of the at least one user;

instructions that configure the processor to authorize access to a resource when the at least one gesture corresponds to a predefined gesture;

instructions that configure the processor to determine whether the recognized at least one gesture comprises a public gesture and a private gesture in accordance with a specific zone where the gesture was performed, the specific zone being selected from a plurality of zones relative to a body frame of the at least one user, wherein the plurality of zones comprises a public zone and a private zone;

instructions that configure the processor to obtain at least one of a public encryption key corresponding to the public gesture and a private encryption key corresponding to the private gesture in response to the recognized at least one gesture; and instructions that configure the processor to authorize access to the resource based on the determined public gesture and the determined private gesture.

7. The system of claim 6 wherein the processor is configured by the instructions to determine that the at least one gesture is the public gesture when the processor determines that the gesture was performed in the public zone.

8. The system of claim 6 wherein the processor is configured by the instructions to determine that the at least one gesture is the private gesture when the processor determines that the gesture was performed in the private zone.

9. The system of claim 6, wherein when the processor authorizes access to the resource, the processor authorizes a secure video call or authorizes the at least one user to access the resource comprising a database, a computer application, or content.

10. The system of claim 6, wherein the processor is configured by the instructions to associate the public encryption key with the public gesture and associate the private encryption key with the private gesture.

11. A computer readable non-transitory memory medium comprising a computer program stored thereon, the computer program being configured to perform a secure communication process, the computer program comprising a program portion configured to:

configure a processor to obtain sensor information of at least one user, the sensor information comprising one or more of image information or depth information;

configure the processor to recognize at least one gesture in accordance with the sensor information of the at least one user;

configure the processor to authorize access to a resource when the at least one gesture corresponds to a predefined gesture;

configure the processor to determine whether the recognized at least one gesture comprises a public gesture and a private gesture in accordance with a specific zone where the gesture was performed, the specific zone being selected from a plurality of zones relative to a body frame of the at least one user, wherein the plurality of zones comprises a public zone and a private zone;

configure the processor to obtain at least one of a public encryption key corresponding to the public gesture and a private encryption key corresponding to the private gesture in response to the recognized at least one gesture; and configure the processor to authorize access to the resource based on the determined public gesture and the determined private gesture.

12. The computer program of claim 11 wherein the program portion is further configured to determine that the at least one gesture is the public gesture when it is determined that the at least one gesture was performed in the public zone.

13. The computer program of claim 11 wherein the program portion is further configured to determine that the at least one gesture is the private gesture when it is determined that the at least one gesture was performed in the private zone.

14. The computer program of claim 11, wherein when the program portion authorizes access to the resource, the program portion is further configured to authorize a secure video call or authorize the at least one user to access the resource comprising a database, a computer application, or content.

15. The computer program of claim 11, wherein the program portion is further configured to associate the public encryption key with the public gesture and associate the private encryption key with the private gesture.

* * * * *